United States Patent
Alam et al.

(10) Patent No.: US 7,480,699 B2
(45) Date of Patent: Jan. 20, 2009

(54) SYSTEM AND METHOD FOR REPLACING AN APPLICATION ON A SERVER

(75) Inventors: Kamrul Alam, Longmont, CO (US); Erik Bartholomy, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/761,105

(22) Filed: Jan. 20, 2004

(65) Prior Publication Data

US 2005/0160419 A1 Jul. 21, 2005

(51) Int. Cl.
*G06F 15/167* (2006.01)
(52) U.S. Cl. .................. 709/217; 709/213; 717/170
(58) Field of Classification Search ............... 717/168, 717/170, 171; 707/10
See application file for complete search history.

(56) References Cited

U.S. PATENT DOCUMENTS

| | | | | |
|---|---|---|---|---|
| 5,403,639 | A | * | 4/1995 | Belsan et al. ............... 707/204 |
| 5,600,832 | A | * | 2/1997 | Eisenberg et al. ........... 707/203 |
| 5,706,510 | A | * | 1/1998 | Burgoon .................... 707/203 |
| 5,919,247 | A | | 7/1999 | Van Hof et al. ............. 709/217 |
| 6,006,034 | A | * | 12/1999 | Heath et al. ................. 717/170 |
| 6,360,366 | B1 | * | 3/2002 | Heath et al. ................. 717/178 |
| 6,457,170 | B1 | | 9/2002 | Boehm et al. ............... 717/106 |
| 6,502,205 | B1 | | 12/2002 | Yanai et al. .................... 714/7 |
| 6,587,837 | B1 | | 7/2003 | Spagna et al. ................. 705/26 |
| 6,601,057 | B1 | | 7/2003 | Underwood et al. ........... 707/1 |
| 6,625,641 | B1 | | 9/2003 | Hare et al. ................... 709/203 |
| 6,697,795 | B2 | * | 2/2004 | Holcomb ....................... 707/2 |
| 6,912,571 | B1 | * | 6/2005 | Serena ....................... 709/224 |
| 6,973,546 | B2 | * | 12/2005 | Johnson ..................... 711/141 |

(Continued)

OTHER PUBLICATIONS

WO 03/005192, Ossiansson et al; A System and a Method for Selecting a Preconfigured Operating System for a Server.*

*Primary Examiner*—William C. Vaughn, Jr.
*Assistant Examiner*—Thomas Richardson
(74) *Attorney, Agent, or Firm*—Duke W. Yee; Arthur J. Samodovitz; Gerald H. Glanzman

(57) ABSTRACT

A system and method for controlling access to first and second applications in a shared storage. A first server requests from a first local storage a copy of an application identified by a first hierarchical directory. The first server request is redirected from the first local storage to the first application in the shared storage. The first application in the shared storage has a second, extended hierarchical directory comprising the first hierarchical directory plus a lower level qualifier. Subsequently, a second server requests from a second local storage a copy of an application identified by the first hierarchical directory. The second server request is redirected from the second local storage to the second application in the shared storage. The second application in the shared storage has a third, extended hierarchical directory comprising the first hierarchical directory plus a lower level qualifier different than the lower level qualifier of the second, extended hierarchical directory. The second application can be a more recent version of the first application. Also, there can be a proxy server which routed the request for the application identified by the first hierarchical directory to the first server, and further comprising the step of reconfiguring the proxy server to route subsequent requests for the application identified by the first hierarchical directory to the second server instead of the first server.

1 Claim, 3 Drawing Sheets

U.S. PATENT DOCUMENTS 7,103,617 B2 * 9/2006 Phatak ............... 707/201
7,117,249 B1 * 10/2006 Kitamura et al. .......... 709/215
7,206,852 B2 * 4/2007 Ferguson et al. .......... 709/229
7,213,141 B2 * 5/2007 Nakayama et al. .......... 713/1
7,216,148 B2 * 5/2007 Matsunami et al. ........ 709/216

* cited by examiner

US 7,480,699 B2

SYSTEM AND METHOD FOR REPLACING AN APPLICATION ON A SERVER

BACKGROUND OF THE INVENTION

The invention relates generally to computer systems, and deals more particularly with a technique to replace an application running on a server.

Computer servers are well known today to handle requests made via a network, such as the Internet. To access a server, a user on the Internet can type in or select a URL via the user's web browser. This request is then routed through the Internet to the address indicated by the URL. For example, if the address is "www.IBM.com/projects/subproject", the request will first be routed to a server at address "www.IBM.com" (typically via a firewall that protects the server). The remainder of the URL, i.e. /projects/subproject, identifies the application (by name or location) that can provide the requested service. This application can reside on the server at address "www.IBM.com" or another server, in which case the server at address "www.IBM.com" serves as a proxy server. In the latter case, the server at "www.IBM.com" will route the request to the server which runs the application identified by "/projects/subproject". When the application is invoked by the request, the application may interact with the user and provide requested information via web pages.

The following is a known example of the foregoing process. The server at "www.IBM.com" is a "proxy" server because of its role in routing requests to other servers. The proxy server at "www.IBM.com" has a table or listing of other, "working" servers and the applications they run. For example, assume the table indicates that ServerA executes the requested application "/projects/subproject". In this example, to route the user request, the proxy server modifies the requested URL to "ServerA.IBM.com/project/subproject", and then sends it to the working server, "ServerA", that has access to the requested application. When ServerA receives the modified URL, it extracts the application name or location "/projects/subproject", and passes the application identity to a middleware program within ServerA. The middleware program is an interface which runs or hosts various application(s) to which requests are made. Typically, the application will need to query a data base to obtain or build an initial web page to return to the requester. The database may be managed by a separate, "backend" server coupled to the working server. The application will then return the initial web page to the user's web browser via the middleware program and the Internet. The initial web page is generally interactive in that it includes links to other web pages to be returned by the application.

In some cases, there is only one working server that needs to run the application. In such cases, the "master" copy of the application can be stored in storage which is local and dedicated to the working server. When the working server is first activated, it reads and initializes the application from its local storage. Then, the working server creates and caches in the working server an "instance" of the application for execution in the working server. By caching and executing the instance of the application in the working server, the working server does not have to download the application from its local storage for each request. If there are other servers that need to run the application, the master copy of the application can be maintained in a shared storage.

When the application needs to be updated or replaced, the working server is shut down, and the updated or new application is installed in the dedicated storage or shared storage, as the case may be. Then, the working server is restarted and notified to read the updated or new application from dedicated storage or shared storage to make a new instance for caching and execution with the working server. The updated or new application is tested using a proxy server. This technique rendered the updated or new application unavailable for productive use for a considerable period of time.

The following technique was also known to replace or upgrade an application. A URL to a proxy server (before reformatting) to access an application "/project/subproject" was "www.IBM.com/project/subproject". The proxy server at www.IBM.com referenced a table to determine which working server is running that application. Then, the proxy server reformatted the URL to route the request to that server. If ServerA is running that application as indicated by the table, then the proxy server reformatted the request to "ServerA.www.IBM/project/subproject". If ServerA does not currently have an instance copy of the application in its cache, middleware within ServerA requests the application from its local storage at address "/project/subproject". However, in this scenario, the application does not reside in ServerA's local storage Instead, the application is stored in a shared (or "distributed file") storage and renamed/readdressed as "/projectA/subproject" in the shared storage. Also, a symbolic link to the application in the shared storage is maintained in ServerA's local storage at address "/project/subproject" such that requests to copy the application at "/project/subproject" were redirected to "/projectA/subproject" in the shared storage. The following is the known technique to update or replace the application in this scenario. The updated or new application was written into a different location in the shared storage, and a new, test server was set up. The updated or new application in the shared storage was named "/projectB/subproject". The test server was configured to request the application "/project/subproject" from its local storage, and a symbolic link was written into the local storage of the test server to redirect the request to application "/projectB/subproject" from the shared storage. After receiving a copy of the updated or new application, the test server created and cached an instance of the application for testing. A "dummy" proxy server was connected between the test server and the Internet, and an operator sent requests via the Internet and proxy server to the test server for application "/project/subproject". In the foregoing example, the web browser requests would have a URL "www.xyz.com/project/subproject", where the URL of the test server is "www.xyz.com". Then, the operator determined how well the test server with its application instance "/projectB/subproject" handled the requests. After the tests were successfully completed, the operator changed a configuration file in the original proxy server to direct "www.IBM.com/project/subproject" requests to the test server. Thus, the test server with its application instance "/projectB/subproject" became the new working server, replacing the original working server with its application "/projectA/subproject". This change to the configuration file took only a few minutes, so there was little down time for the application.

In the foregoing example, in the shared storage, the name of the application requested by the working server and the test server from their respective local storages differed from the names of the applications in shared storage by a change to the first level qualifier, "/project" versus "/projectA", and "project" versus "/projectB". While the foregoing technique caused much less down time of the application than the earlier technique, it required that the working server and test server (which ultimately became the working server) only run one application each, i.e. "/projectA/subproject" in the working server and "/projectB/subproject" in the test server (which ultimately became the replacement working server). This is because the first level qualifier of the name of each application in shared storage was directed to a specific application, and not a hierarchical group of applications, and certain middleware programs such as IBM WebSphere and IBM HTTP Server (IHS) programs can only reference applications with the same first level qualifier (or "context root"). In this example, there was only one application associated with this first level qualifier, so each server could only run one application. (These types of middleware programs use "relative pathing" which are paths that branch from the directory containing the current document. The paths or directory have no absolute beginning because it is assumed that they start in the current directory of the script/document using the path. In other words, the top node in the hierarchy such as "www.ibm.com" is assumed and does not have to included in the specification of the path). Because of the "relative pathing" feature, these types of middle ware programs are limited to one context route.) For many environments, it is desirable to allow one server with one middleware program of the foregoing type to run multiple applications.

Accordingly, an object of the present invention is to facilitate the use and installation of an updated or new application in a server which also runs other applications using the same middleware program.

Another object of the present invention is to facilitate the use and installation of an updated or new application in a server having a middleware program which is limited to one context route, but would like to run other applications as well.

SUMMARY OF THE INVENTION

The invention resides in a system and method for controlling access to first and second applications in a shared storage. A first server requests from a first local storage a copy of an application identified by a first hierarchical directory. The first server request is redirected from the first local storage to the first application in the shared storage. The first application in the shared storage has a second, extended hierarchical directory comprising the first hierarchical directory plus a lower level qualifier. Subsequently, a second server requests from a second local storage a copy of an application identified by the first hierarchical directory. The second server request is redirected from the second local storage to the second application in the shared storage. The second application in the shared storage has a third, extended hierarchical directory comprising the first hierarchical directory plus a lower level qualifier different than the lower level qualifier of the second, extended hierarchical directory.

In accordance with features of the present invention, the second application is a more recent version of the first application. Also, there can be a proxy server which routed the request for the application identified by the first hierarchical directory to the first server, and further comprising the step of reconfiguring the proxy server to route subsequent requests for the application identified by the first hierarchical directory to the second server instead of the first server.

The invention also resides in a system and method for accessing a first application by a first server and then replacing the first application with a second application executing in a second server. The first server has a first, local storage, and the second server has a second, local storage. A request for an application identified by a first hierarchical directory is routed from a proxy server to the first server. The first server requests from the first local storage the application identified by the first hierarchical directory. The first server request is redirected from the first local storage to the first application in the shared storage. The first application in the shared storage has a second, extended hierarchical directory comprising the first hierarchical directory plus a lower level qualifier. Subsequently, a request for the application identified by the first hierarchical directory is routed to a second server. The second server requests from the second local storage the application identified by the first hierarchical directory. The second server request is redirected from the second local storage to the second application in the shared storage. The second application in the shared storage has a third, extended hierarchical directory comprising the first hierarchical directory plus a lower level qualifier different than that of the second, extended hierarchical directory.

DETAILED DESCRIPTION OF THE PREFERRED EMBODIMENTS

Figure 1:
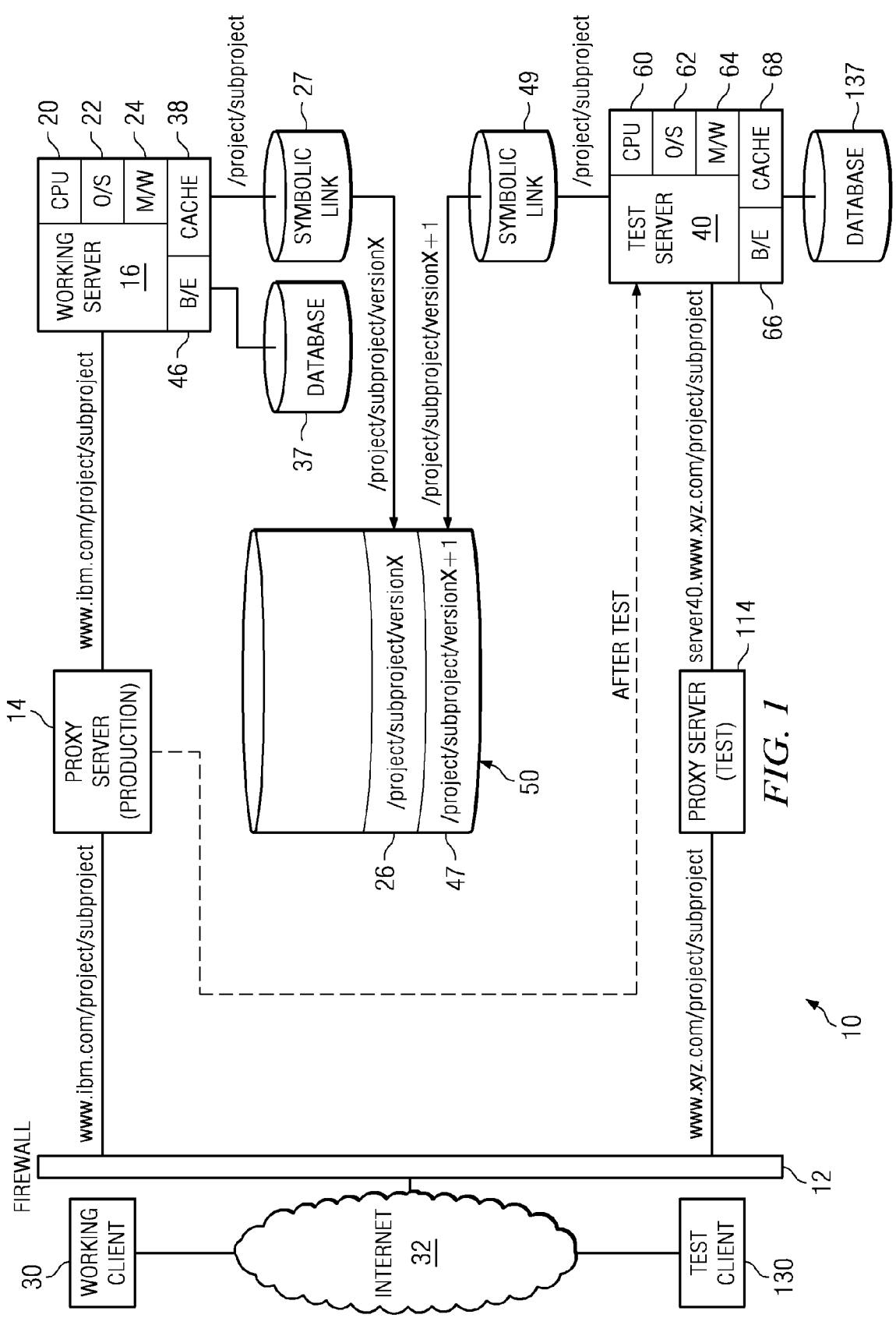
FIG. 1 is a block diagram of a computer system which embodies the present invention.

Embodiments of the present invention will now be described in detail with reference to the drawings. FIG. 1 illustrates a computer system generally designated 10 which embodies the present invention. System 10 includes a firewall 12, a proxy server 14 and a working server 16 such as a web page server. Web page server 16 has a local storage 27 to which it makes requests for a copy of an application 26 with a name or address "/project/subproject". (For purposes of the present invention, the actual name or address fields of the application are not important; "project" and "subproject" are just an example.) The name or address "/project/subproject" is considered a hierarchical directory. Server 16 comprises CPU 20, operating system 22 such as Windows XP/NT (tm of Microsoft Corporation), Linux (tm of Linus Torvalds) or Unix and middleware program 24 such as IBM WebSphere program or IBM HTTP Server program. Server 16 can concurrently execute other applications as well with the same first level qualifier name, i.e. "project" (and a different second level qualifier name). The application name "/project/subproject" is hierarchical where "/project" is the first or highest level in the hierarchy and "/subproject" is the second or lower level in the hierarchy. The "/" after "project" indicates that the next name is a lower level in the hierarchy. A difference in the second or subsequent level name will indicate a different application. The application instance executing in server 16 will interact with a user via web pages. Typically, invocation of the application will result in an initial or "home" web page being sent to and displayed at the user's web browser. From this intitial web page, the user can typically select other web pages.

By way of example, the URL of the proxy server 14 is "www.IBM.com". Application 26 obtains the web pages from a database 37 via a backend database manager program 46. A user/client 30 can make a request via a network such as Internet 32 for application "/project/subproject" by specifying URL "www.IBM.com/project/subproject". In such a case, proxy server 14 receives the request and reads a table to identify the working server which executes this application. Then, server 14 forwards the request to server 16 based on an entry in the table for the latter parts of the application address, "/project/subproject". This forwarding may involve modifying the URL supplied by the user to "Server16.IBM.com/ project/subproject" (where "Server16" in the URL represents the real name or IP address of server 16 as understood by routers). Server 16 then handles the request by executing an instance of the requested application 26. If an instance of the application 26 does not currently reside in cache/memory 38 within server 16, it must be copied from external storage, i.e. shared storage 50. However, the application 26 in shared storage 50 is renamed or re-identified with a third level qualifier or suffix added to the first two levels of the name of the original application. For example, the application 26 is known to server 16 as "/project/subproject", and server 16 thinks the application is stored in local storage 27 with name/ address "/project/subproject". However, in accordance with the present invention, the name/address of the application 16 in shared storage 50 can be "/project/subproject/VersionX" where "VersionX" is the third level qualifier in the hierarchy, and preferably indicates the version number of the original application 26. By using an additional third level qualifier to specify the application in shared storage 50, there are two levels of consistency between the name of the application used by server 16 and the name of the application in shared storage. This facilitates management of the system by a human who can readily recognize different versions of the same application by the same first and second level qualifiers and a different third level qualifier. Also, the middleware 24 of server 16 can reference other, completely different applications with the same first level qualifier, i.e. "project" but a different second level qualifier, i.e. different than "subproject". Likewise, the middleware 24 of server 16 can reference other, completely different applications or different versions of an application, with the same first and second level qualifiers, i.e. "project/subproject" but different third level qualifiers. This type of arrangement is supported by middleware programs such as IBM WebSphere program or IBM HTP Server program. To allow use of application 26 VersionX during normal operation and during the installation and test of updated or new application 47, a symbolic link is written into local storage 27 such that a call by server 16 for "/project/subproject/" to local storage 27 is changed to a call for "/project/subproject/VersionX" in shared storage 50. The symbolic link comprises a standard Unix/NT function called a "symlink" that serves as a "short cut" to an alternative location. This Unix/NT function resides in the local storage 27 and is read into server 16 for execution. Thus, when server 16 requests the application 26 named "/project/subproject" from local storage 27, this request instead gets the application 26 named "/project/subproject/VersionX" from shared storage 50. (There is no need for a copy of application "/project/subproject" or "/project/subproject/VersionX" in local storage 27.)

Also, in accordance with the present invention, when there is a need to update or replace application 26 with updated or new application 47, application 47 is written into shared storage 50 (in a different location than application 26), and a test server 40 is set up. The updated or new application 47 in shared storage 50 is named or identified with another, third level qualifier added to the first two levels of the name/address of the original application 26. For example, if the application 26 known to servers 16 and 40 (and presumed by these servers to be stored in their respective local storages) is identified as "/project/subproject", the name or identity of the updated or new application 47 in shared storage 50 can be "/project/subproject/VersionX+1" where "VersionX+1" is the third level qualifier, and preferably indicates the version number of the updated or new application 26. By using an additional third level qualifier to specify the application in shared storage 50, there are two levels of consistency between the name of the application used by server 40 and the name of the application in shared storage. This facilitates management of the system by a human who can readily recognize different versions of the same application by the same first and second level qualifiers and a different third level qualifier. Also, the middleware 64 of server 40 can reference other, completely different applications with the same first level qualifier, i.e. "project" but a different second level qualifier, i.e. different than "subproject". Likewise, the middleware 64 of server 40 can reference other, completely different applications or different versions of an application, with the same first and second level qualifiers, i.e. "project/subproject" but different third level qualifiers. This type of arrangement is supported by middleware programs such as IBM WebSphere program or IBM HTP Server ("IHS") program. To allow use of this updated or new application 47 Version X+1 during test (and subsequently during normal operation), a symbolic link is written into local storage 49 of server 40 such that a call by server 40 for "/project/subproject/" in local storage 49 is changed to a call for "/project/subproject/VersionX+1" in shared storage 50. The symbolic link or "short cut" to the alternative location is set up using the Unix/NT function described above. This Unix/NT function resides in the local storage 49 and is read into server 40 for execution. Thus, when server 40 requests a copy of the application "/project/subproject", from local storage 49, it instead gets the application 47 "/project/subproject/VersionX+1" from shared storage 50. Server 40 then caches an instance of application 47 in cache memory 68 for use. An operator then proceeds to test the test server 40 with the updated or new application 47 using dummy URL requests directed to test server 40. Preferably, another proxy server 114 is installed between the Internet 32 and server 40. The dummy URL requests are entered by an operator using a web browser, and passed to test server 40 via proxy server 114. During these tests, test server 40 is using a cached instance of updated or new application 47 which it obtained from shared storage name or address "/project/subproject/VersionX+1". After the operator is satisfied that server 40 and updated or new application 47 are working properly, the operator shuts down server 16 and changes a configuration file within proxy server 14 such that requests for the application at address "www.IBM.com/project/subproject" are routed to server 40 (instead of server 16). As explained above, when server 40 requests application "/project/subproject" from its local storage 49 for caching, this request will be redirected to updated or new application 47 with address/name "/project/subproject/VersionX+1" in shared storage 50. Server 40 gets the actual web pages selected by application 47 from a database 137 via a database manager program 66. The change of the configuration file in proxy server to point to server 40 typically can be made within a few minutes, so there is little down time of the application. Afterwards, server 16 is available for other purposes.

Figure 2A:
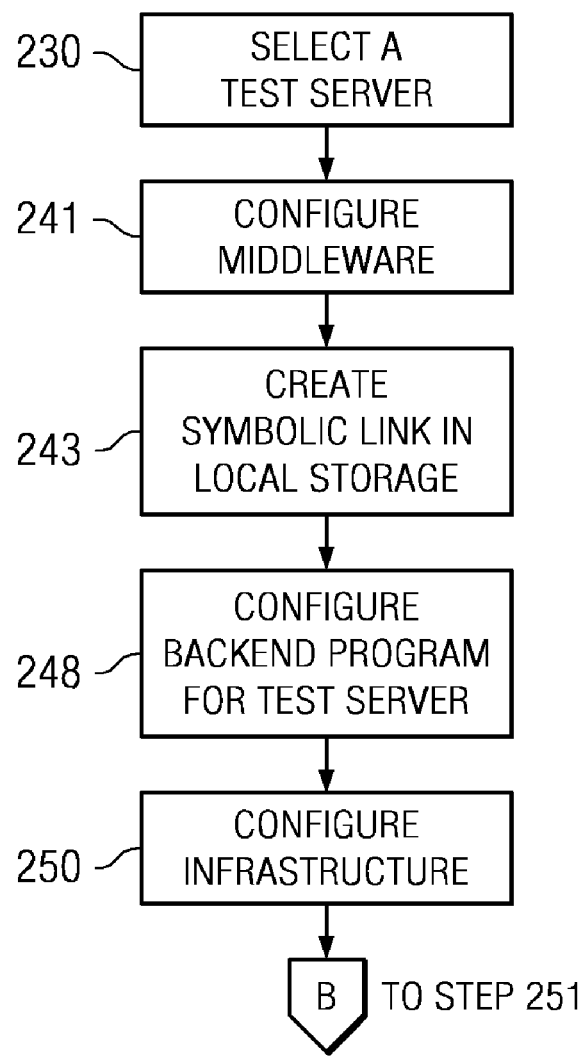
FIGS. 2(a) and 2(b) form a flow chart illustrating part of a process for replacing an application in shared storage with an updated or new application according to the present invention.

FIG. 2(*a*) illustrates in more detail the foregoing process of setting up test server 40. The first step is to select a server with sufficient capacity and resources to be the test server 40 (step 230). Preferably, server 40 is a "shared" server and can also execute other applications to perform other functions for other customers. Server 40 can be shared when the middleware required for the new application 47 is compatible with the other applications used for the other customers and when the middleware allows relative pathing, i.e. such as IBM WebSphere program or IBM HTP Server program. Test server 40 includes a processor 60, an operating system such as NT, Linux or Unix 62, a middleware program 64 such as IBM WebSphere or IBM HTP Server program and local storage 49. Next, the operator configures middleware program 64 on the new server instance with new code, content, application data, message queuing channels, and property files (step 241). Next, the operator writes a symbolic link into local storage 49 such that a call by server 40 for "/project/subproject/" is changed to a call for "/project/subproject/VersionX+1" from shared storage 50 (step 243). This symbolic link comprises a standard Unix/NT function that serves as a "short cut" to an alternative location. Thus, when server 40 requests a copy of the application "/project/subproject" from local storage 47, it instead gets application 47 "/project/subproject/VersionX+1" from shared storage 50. Next, the operator configures a back-end program 66 such as IBM DB2 database manager program for the test server 40 (step 248). This configuration creates a database catalog link so that the back end program 66 is connected to the actual database (not shown) which is typically separate from server 40. Next, the operator configures the infrastructure which may include setting MQ channels, property files, passwords, firewall rules and cron jobs required by the application (step 250).

Figure 2B:
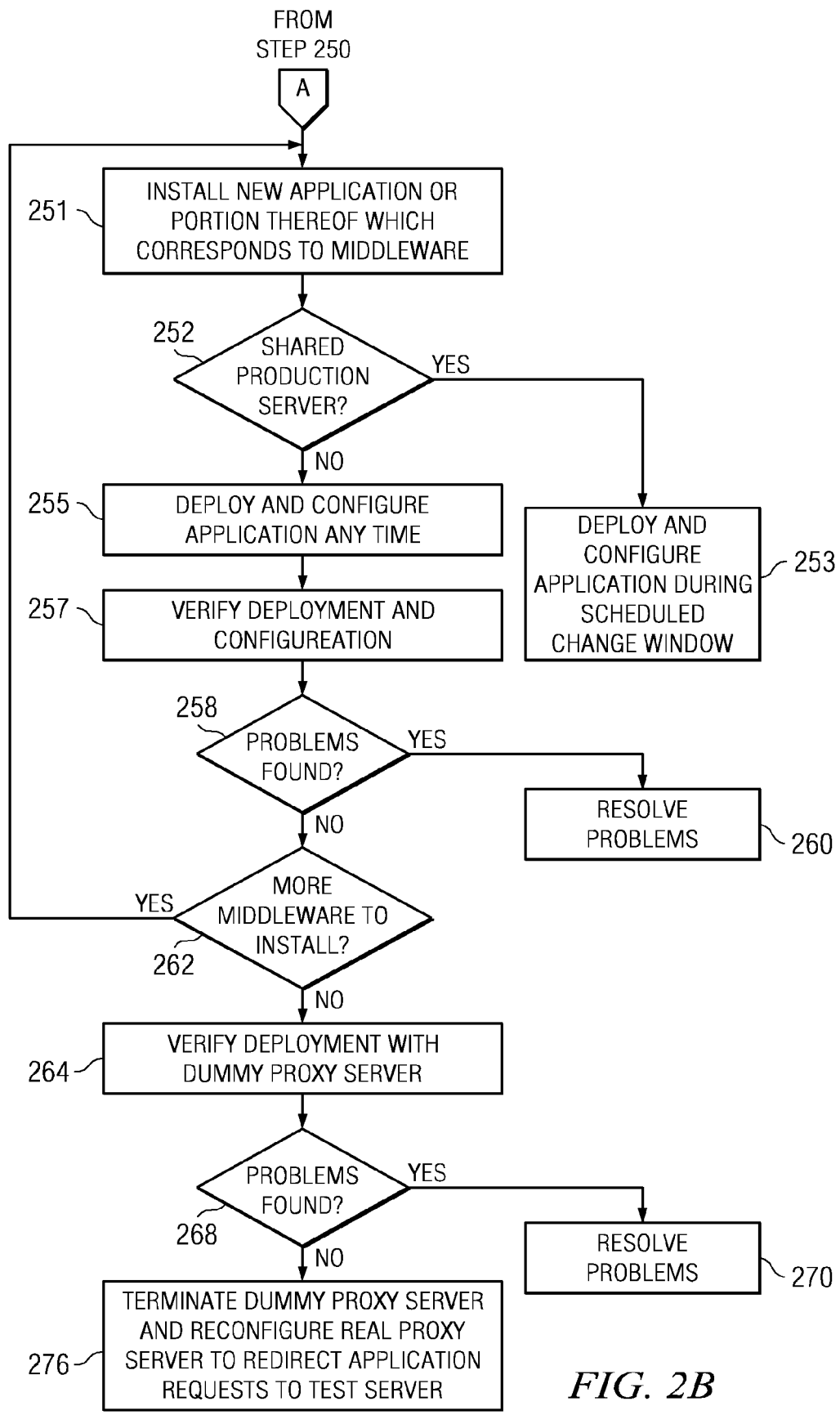

FIG. 2(b) illustrates in detail the deployment and testing of the updated or new application 47 on server 40. The first step is to install the application 47 in server 40 (step 251). In some cases, the middleware is installed in stages, and if so, the application 47 is also installed in stages as appropriate for the middleware which is installed. Installation of the application 47 comprises the steps of promoting code to the distributed file system and performing various configuration changes so that the application works in the web hosting environment. These configuration changes include setting up java heap sizes, adjusting number of active threads, work load management and clones. After each stage of installation, the following steps 252 to 260 are performed. If server 40 is a shared server, i.e. being used for other customer work (decision 252, yes branch), then deployment and configuration of application 47 will be performed during a scheduled change window (step 253). Referring again to decision 252, no branch, if the server 40 is not a shared server, then deployment and configuration of application 47 can occur at any time (step 255). In either case, verification of server 40 will be performed (step 257). Verification comprises the steps of making sure the application works properly. For example, the tester may attempt to log on to the application and then obtain expected data. If problems were found during the verification phase (decision 258, yes branch) or during a set up operation, then an operator attempts to identify and resolve the problems (step 260). This may comprise making additional configuration changes. This identification and resolution of problems will be performed during a scheduled change window if server 40 is a shared server; otherwise, it can be performed at any time. If no problems were identified during the verification phase or the setup operation, then a determination is made whether there is additional middleware and a corresponding, additional portion of application 47 to install (decision 262). If so (decision 262, yes branch), then processing returns to step 251 as described above. If not (decision 262, no branch), then dummy proxy server 114 is set up and configured to route requests for application "www.xyz.com/projects/subprojects" to test server 40 (step 264). (In this example, "www.xyz.com" is the URL of proxy server 114. Usually, these requests will originate from a tester using a client computer 130 on the Internet. This set up and configuration comprises adding appropriate proxy statement to the test proxy server; these statements will be placed in the production proxy server during the "cut-over" time. In the foregoing example, the proxy server 14 would modify the requested URL to "Server40.www.xyz.com/projects/subprojects" (where "Server40" represents a real routing address of IP address for server 40). If problems are found with application 47 (decision 268, yes branch), then an attempt is made to resolve them (step 270). After all the problems are resolved, or if there were no problems detected in decision 268, then the operator shuts down the dummy proxy server 114 and server 16, and reconfigures the real proxy server 14 to direct all requests for "www.IBM.com/project/subproject" to server 40 (step 276). The reconfiguration of real proxy server 14 comprises taking the proxy statements off the test server, or adding a proxy statement with the new server 40 location. The operator also reconfigures the test server 40 to remove the proxy statements in the test proxy server by preventing a dual path to the new production application. The reconfiguration of the test server 40 comprises removing the test proxy statements. After the reconfiguration of proxy server 14 and test server 40, server 40 becomes a working server, replacing server 16.

Based on the foregoing, a system, method and program product for replacing an application in one server with another application in another server has been disclosed. However, numerous substitutions and modifications can be made without deviating from the scope of the present invention. For example, other middleware products and or versions, including database applications can be used. Therefore, the present invention has been disclosed by way of illustration and not limitation, and reference should be made to the following claims to determine the scope of the present invention.

The invention claimed is:

1. A method for accessing a first application by a first server and then replacing said first application with a second application executing in a second server, said first server having a first, local storage, said second server having a second, local storage, said method comprising the steps of:

routing a request for an application identified by a first level name and a second level name from a proxy server to said first server, said first server requesting from said first local storage said application identified by said first level name and said second level name, said request being redirected from a first local storage to said first application in a shared storage, said first application in said shared storage having said first level name, said second level name and a third level name, wherein said first level name, said second level name and said third level name of said first application represent qualifiers that form a first hierarchical directory in said shared storage, wherein a first level qualifier of said first application indicates a name of said first application, a second level qualifier of said first application indicates an address of said first application, and a third level qualifier of said first application indicates a version number of said first application;

accessing, by a third server, said first application from said shared storage, said first application identified by a second, extended hierarchical directory comprising said first level hierarchy plus a lower level qualifier;

subsequently routing a request for said application identified by said first level name and said second level name to a second server, wherein the second server is a test server, said second server requesting from said second local storage, said application identified by said first level name and said second level name, said request being redirected from said second local storage to a second application in said shared storage, said second application in said shared storage having said first level qualifier of said first application, said second level qualifier of said first application, and a third level name different than said third level name of said first application in said shared storage, wherein said first level name, said second level name and said third level name of said second application represent qualifiers that form said second, extended hierarchical directory in said shared storage, wherein the different third level name is a third level qualifier of said second application that indicates a different version number, the different version number identifying said second application as a more recent version of said first application;

configuring a test proxy server to route requests to said test server by adding a proxy statement to the test proxy server;

verifying a proper operation of said application on said test server;

responsive to verifying a proper operation of said application, permanently reconfiguring said proxy server to route all subsequent requests for said application identified by said first level name and said second level name to said test server instead of said first server, wherein permanently reconfiguring said proxy server comprises adding said proxy statement to said proxy server; and terminating the test proxy server by removing the proxy statement.

* * * * *